(12) United States Patent
Wrobbel

(10) Patent No.: US 6,488,883 B1
(45) Date of Patent: Dec. 3, 2002

(54) PROCESS AND APPARATUS FOR PRODUCING A PLASTIC BLOW-MOLDED PART

(75) Inventor: Werner Wrobbel, Gütersloh (DE)

(73) Assignee: Möller Plast GmbH, Bielefeld (DE)

( * ) Notice: Subject to any disclaimer, the term of this patent is extended or adjusted under 35 U.S.C. 154(b) by 22 days.

(21) Appl. No.: 09/694,438

(22) Filed: Oct. 23, 2000

(30) Foreign Application Priority Data

Oct. 22, 1999 (DE) .......................... 199 50 896

(51) Int. Cl.[7] .................. B29C 49/04; B29C 49/16; B29C 49/20
(52) U.S. Cl. .................. 264/515; 264/512; 425/504; 425/521; 425/529; 425/532
(58) Field of Search .................. 425/504, 515, 425/521, 529, 388, 522, 530, 532; 264/512, 515

(56) References Cited

U.S. PATENT DOCUMENTS

| | | | | |
|---|---|---|---|---|
| 3,250,660 A | * | 5/1966 | Greig et al. ............. | 425/504 |
| 3,334,164 A | * | 8/1967 | Samuels et al. .......... | 264/526 |
| 3,452,391 A | * | 7/1969 | Langecker ................ | 425/529 |
| 3,736,201 A | * | 5/1973 | Teraoka .................. | 264/516 |
| 3,753,830 A | * | 8/1973 | Cruckshank et al. ....... | 425/388 |
| 3,964,856 A | * | 6/1976 | Day ...................... | 425/503 |
| 3,971,687 A | * | 7/1976 | Greer et al. ............. | 425/522 |
| 4,592,718 A | * | 6/1986 | Teraoka .................. | 425/504 |
| 4,801,347 A | * | 1/1989 | Garwood .................. | 264/512 |
| 5,037,289 A | * | 8/1991 | Ohta et al. .............. | 425/532 |
| 5,114,522 A | * | 5/1992 | Takado et al. ............ | 264/515 |
| 5,368,808 A | * | 11/1994 | Koike et al. ............. | 264/512 |
| 6,045,647 A | * | 4/2000 | Takikawa et al. .......... | 264/515 |

* cited by examiner

Primary Examiner—Robert Davis
(74) Attorney, Agent, or Firm—Laurence A. Greenberg; Werner H. Stemer; Ralph E. Locher

(57) ABSTRACT

A process for producing a plastic blow-molded part. A plastically deformable plastic parison with a first subregion and an opposite second subregion is placed between a molding element having a projecting region and a mold interacting with the molding element. A positive pressure is generated between the molding element and the first subregion and within the parison, to keep the first subregion at a distance from the molding element and to keep the first and second subregions at a distance from each other. A stretching region of the first subregion is preformed by moving the molding element in relation to an edge region in the direction of the mold and by generating a negative pressure between the projecting region and the stretching region of the first subregion. The subregions are deformed for generating a positive pressure within the parison.

18 Claims, 3 Drawing Sheets

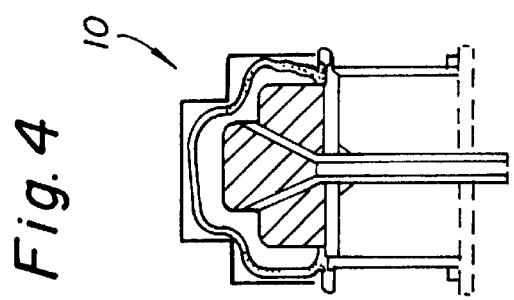
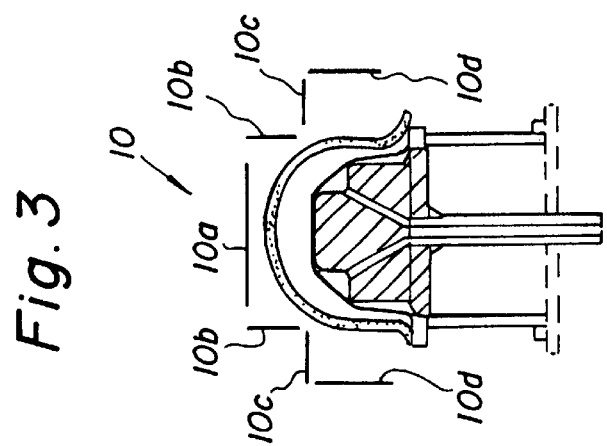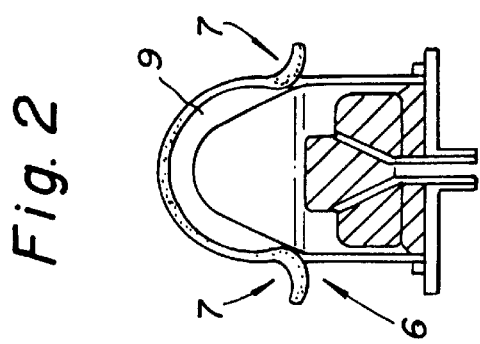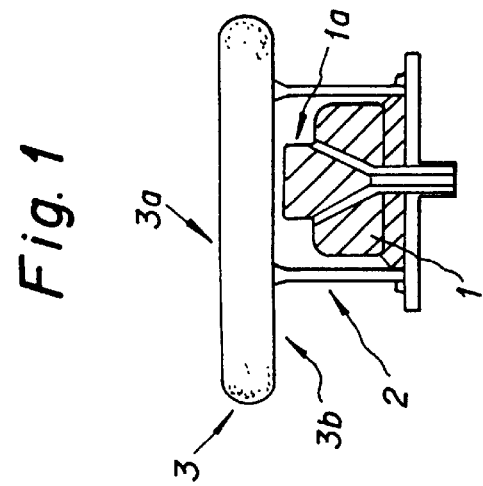

/ 1

PROCESS AND APPARATUS FOR PRODUCING A PLASTIC BLOW-MOLDED PART

BACKGROUND OF THE INVENTION

FIELD OF THE INVENTION

The invention relates to a process and an apparatus for producing a plastic blow-molded part.

In the production of blow-molded parts, a parison is in most cases negatively preformed for forming the contours. This has the effect that, when there is great stretching, thin points occur in critical regions and may lead to the failure of the component. Although this occurrence can be counteracted by a greater initial wall thickness, this leads to higher material consumption and greater wall thickness variations and to higher component costs overall.

A further disadvantage in the production of blow-molded parts with great stretching is that the surface quality is impaired when producing parts with inserted decorative materials (for example textile, film etc.) on account of the great distortion.

SUMMARY OF THE INVENTION

It is accordingly an object of the invention to provide a process and an apparatus for producing a plastic blow-molded part that overcomes the above-mentioned disadvantages of the prior art methods and devices of this general type, in which stretchings that are as uniform as possible can be achieved in the parison and the greatest possible remaining wall thickness in comparison with the initial parison can be achieved in the critical regions, it being intended for the use of material to be minimized and the drawing-out behavior and surface quality to be favorably influenced.

With the foregoing and other objects in view there is provided, in accordance with the invention, a process for producing a plastic blow-molded part. The process starts by providing a plastically deformable plastic parison having a first subregion and an opposite second subregion. The parison is placed between a molding element having at least one projecting region and a mold interacting with the molding element. An edge region of the parison is held in a fixed position which is adapted to a mold parting region of the plastic blow-molded part to be produced resulting in a fixedly held edge region. A positive pressure is generated between the molding element and the first subregion and within the parison for keeping the first subregion at a distance from the molding element and to keep the first subregion and the second subregion at a distance from each other. At least one stretching region of the first subregion is preformed by moving the molding element in relation to the fixedly held edge region in a direction of the plastic blow-molded part and by generating a negative pressure between the projecting region and the stretching region of the first subregion to bring at least the stretching region of the first subregion to bear against the projecting region of the molding element. The first subregion and the second subregion are deformed for generating the positive pressure within the parison, the first subregion being brought to bear against the molding element and the second subregion being brought to bear against the mold.

It is preferably that the first subregion is preformed by generating a negative pressure between the molding element and the entire first subregion, in order to bring the first subregion in its entirety to bear against the molding element.

It may be provided that a negative pressure is generated between the mold and the second subregion, in order to bring the second subregion to bear against the mold.

In a preferred embodiment it is provided that the mold is itself opened by moving two or more mold elements apart and, is closed by moving the mold elements together to a contour of the blow-molded part to be produced. In this case, it may be provided that a negative pressure is generated between the mold or its mold elements and the second subregion.

In one embodiment it may be provided that, a decorative material is introduced on a visible side of the blow-molded part to be produced.

The plastic parison may be a coextruded parison having at least two layers. The parison may in this case have at least one reinforced, preferably fiber-reinforced, layer and an unreinforced layer.

The molding element may be formed by a (first) mold that interacts with the (second) mold. Alternatively, it may be provided that the molding element is formed by a plastic molded part which interacts with the (second) mold. In this case, the plastic molded part is preferably covered with a decorative material.

With the foregoing and other objects in view there is further provided, in accordance with the invention, an apparatus for producing a plastic blow-molded part. The apparatus is formed of a molding element having at least one projecting region with openings formed therein which can be connected to a negative pressure source. A molding box surrounds the molding element and can be subjected to negative pressure. The molding box and the molding element are movable in relation to each other and the molding box has a peripheral edge for one of securely holding and securely clamping an edge region of a parison. The apparatus also has a mold disposed opposite the molding element.

It is preferably provided that the contour elements for preforming the parison are disposed in the molding box.

It is preferably provided that the mold is of a divided configuration, mold elements of the mold being movable in such a way that, in the moved-together state, they can be brought to bear against a contour of the molded part to be produced, in particular against the one projecting region of the molding element. It is at the same time expediently provided that the mold elements of the mold are provided with openings that can be connected to a negative pressure source.

In a preferred embodiment, it is provided that the preforming mold is formed at least in certain regions as a jointed band with a number of articulation points.

It may be provided that the molding element is configured as a (first) mold which interacts with the (second) mold. Alternatively, the molding element may be a preformed plastic part that interacts with the mold.

Other features which are considered as characteristic for the invention are set forth in the appended claims.

Although the invention is illustrated and described herein as embodied in a process and an apparatus for producing a plastic blow-molded part, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, illustration of an apparatus for producing a plastic blow-molded part in an initial state according to the invention;

FIG. 2 is an illustration of the apparatus according to FIG. 1 in a first mold state;

FIG. 3 is an illustration of the apparatus according to FIG. 1 in a second mold state;

FIG. 4 is an illustration of the apparatus according to FIG. 1 in a final mold state;

DESCRIPTION OF THE PREFERRED EMBODIMENTS

Figure 5:
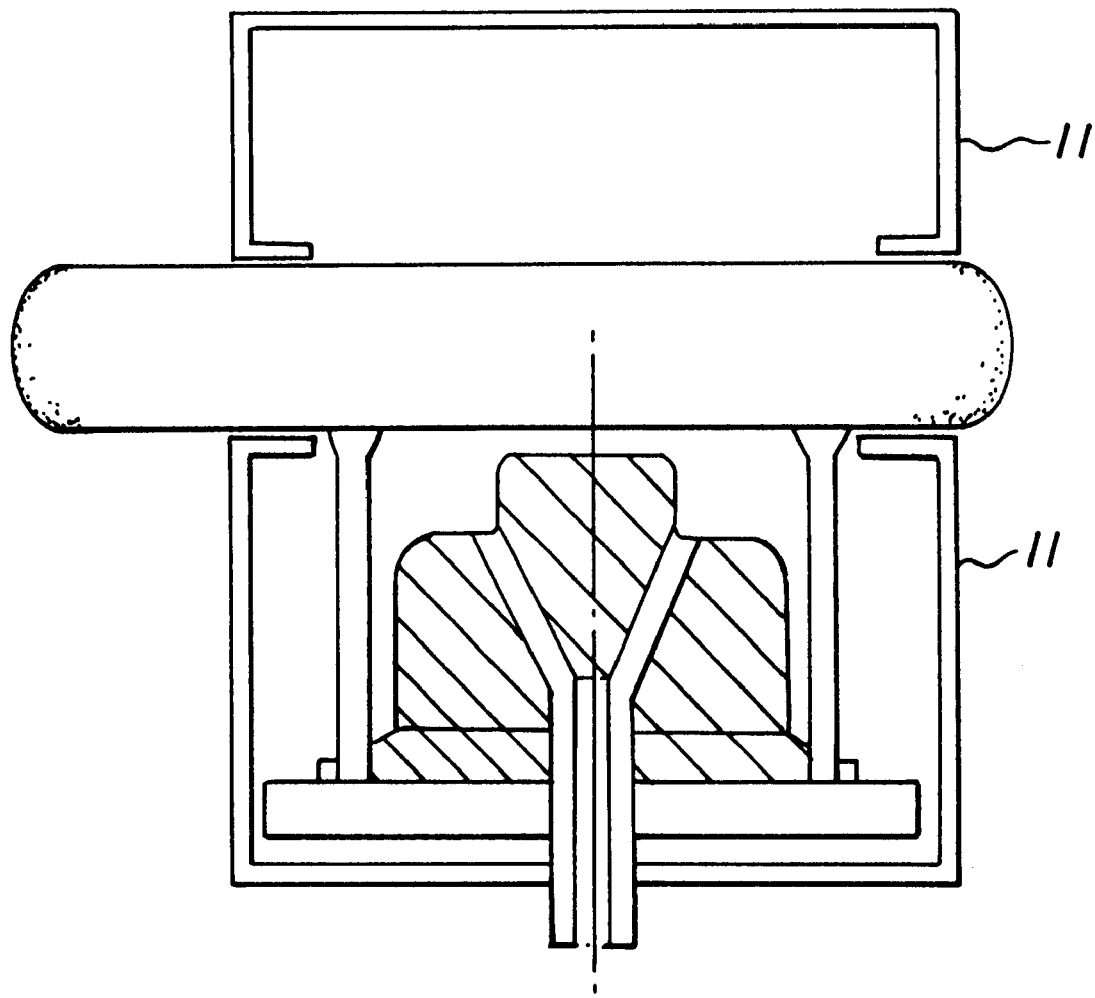
FIG. 5 is an illustration of the apparatus according to FIG. 1 showing the separate holding device in an open position.
Figure 6:
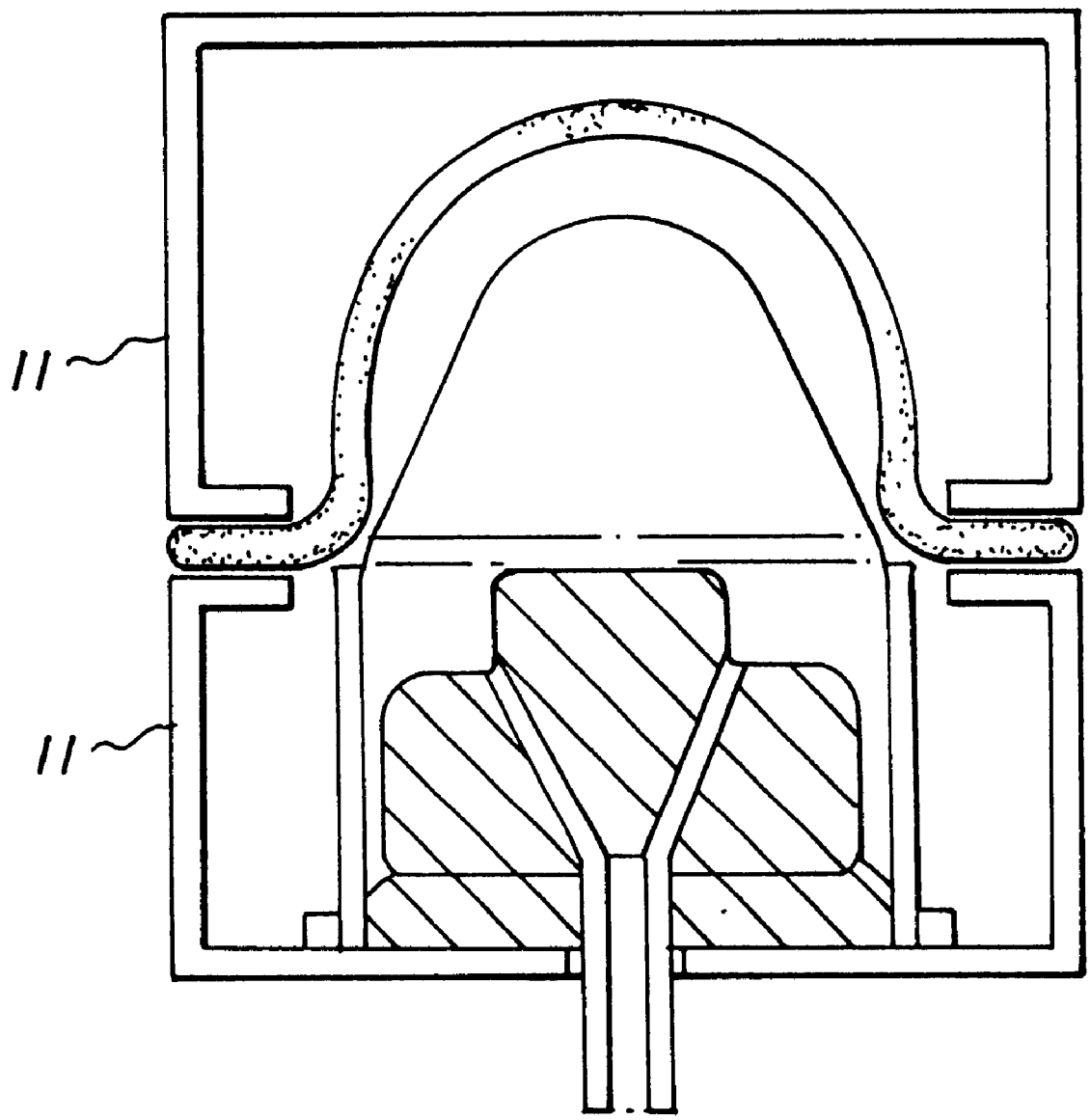
FIG. 6 is an illustration of the apparatus according to FIG. 1 showing the separate holding device in an closed position.

In all the figures of the drawing, sub-features and integral parts that correspond to one another bear the same reference symbol in each case. Referring now to the figures of the drawing in detail and first, particularly, to FIG. 1 thereof, there is shown a molding or blow-molding apparatus. The apparatus contains a molding element 1 acting as a male mold, a mold 10 functioning as a female mold (only represented in FIGS. 3 and 4), a molding box 2 on the male mold side, a parison 3 being preformed at both end face regions, and if need be at the longitudinal sides, of the apparatus (above and below the plane of representation) by corresponding contour elements (not represented). The molding apparatus is then closed in a pressure tight or vacuum tight manner on the male mold side along a peripheral border 6 of the molding box 2 by clamping a peripheral edge region 7 of the parison 3, so that the parison 3 is securely held on this side and comes to bear against the contour of the molding box 2, which corresponds to the mold parting region. The secure clamping of the edge region 7 of the parison 3 may take place for example by a corresponding (complementary) contour of the mold 10 or by a separate holding device 11.

The molding element 1 may be formed in this case in a way known per se by a first mold or core interacting with the second mold 10, acting as the female mold, it being possible for one or more fixed or movable mold elements to be present and for these elements to be insulated or heated. It may alternatively be provided that the molding element 1 acting as the male mold is formed by a plastic molded part already having the desired shape of a part to be produced, such a plastic molded part replacing the core and being provided in a corresponding way with bores for negative or positive pressure. This gives rise to the special advantage that even decorative materials which are impermeable to air can be applied to such a plastic molded part, since the air located between the decorative material and the plastic molded part can escape through the bores.

As represented in FIG. 2, a positive pressure is generated in an interior 9 of the parison 3, so that two parison halves (first subregion 3b and second subregion 3a) are kept at a distance, avoiding contact and the associated undesired fusing of the two parison halves 3a, 3b. A positive pressure is also generated between the molding element 1 and the parison 3, i.e. within the mold cavity 2, in order that the first subregion 3b is kept at a distance from the molding element 1.

In a region of the greatly projecting, critical contour of the male mold side, the second mold 10 or the mating mold side (female mold) has divided mold elements or slide elements 10a–10d, which are initially (FIGS. 1 to 3) moved into a starting position and open the mating region to a corresponding extent. In this state, the male mold 1 is moved into the mating contour of the female mold 10 (FIG. 3). With corresponding prestretching of the parison 3 on the female mold side 10, the mold elements 10a, 10b, 10c, 10d of the female mold 10 are moved into their end position (FIG. 4), corresponding to the shape of the mold element 1. Whereupon the mold element 1 is then possibly moved in the direction of the female mold 10 into its end position if it has not already been moved right away into its end position, so that the two mold halves are then completely closed.

The process according to the invention and the apparatus according to the invention combine to a certain extent the advantages of thermoforming with those of pressure molding of blow-molded parts. If the parison 3 is formed of a material which is not very tacky, it may be adequate if the (second) mold 10 on the female mold side is fixed and does not have any mold elements which can be moved apart. By selective pressure build-up in the interior 9 of the parison 3 and between the first subportion and the molding box 2 or the molding element 1, in such a case the first subportion of the parison 3 can be brought into contact with the second mold 10 on the female mold side in one step.

Further controlling of the wall thicknesses can be carried out by the parison 3 having wall thicknesses which differ in a way known per se in the circumferential direction and/or longitudinal direction, which takes place by correspondingly controlling the width of the gap of the die producing the parison.

In a development of the apparatus, the component contour may be formed in the critical regions (high stretching) by a jointed band which has corresponding articulation points and, by the extent to which corresponding actuating elements at the articulation points can move, permits a displacement-dependent adaptation up to the final formation of the contour of the blow-molded part to be produced. The jointed band itself may have, according to the contour formation, a multiplicity of jointedly interconnected elements (corresponding to the mold elements 10a–10d), that permit a gentle, displacement-dependent adaptation of the contour.

I claim:

1. A process for producing a plastic blow-molded part, which comprises the steps of:

providing a plastically deformable plastic parison having a first subregion and an opposite second subregion;

placing the parison between a molding element having at least one projecting region and a mold interacting with the molding element;

keeping an edge region of the parison in a fixed position which is adapted to a mold parting region of the plastic blow-molded part to be produced resulting in a fixedly held edge region;

generating a positive pressure between the molding element and the first subregion and within the parison for keeping the first subregion at a distance from the molding element and to keep the first subregion and the second subregion at a distance from each other;

preforming at least one stretching region of the first subregion by moving the molding element in relation to the fixedly held edge region in a direction of the plastic blow-molded part and by generating a negative pressure between the projecting region and the stretching region of the first subregion to bring at least the stretching region of the first subregion to bear against the projecting region of the molding element; and deforming the first subregion and the second subregion for generating the positive pressure within the parison, the first subregion being brought to bear against the molding element and the second subregion being brought to bear against the mold.

2. The process according to claim 1, which comprises preforming the first subregion by generating the negative pressure between the molding element and all of the first subregion to bring the first subregion in its entirety to bear against the molding element.

3. The process according to claim 1, which comprises generating a negative pressure between the mold and the second subregion to bring the second subregion to bear against the mold before performing the deforming step.

4. The process according to claim 1, which comprises opening the mold by moving at least two of the mold parts forming the mold before performing the generating step, and, after the preforming step, closing the mold by moving the mold parts together to a contour of the plastic blow-molded part to be produced.

5. The process according to claim 4, which comprises generating a negative pressure between the mold and the second subregion.

6. The process according to claim 1, which comprises introducing a decorative material on a visible side of the plastic blow-molded part to be produced before performing the generating step.

7. The process according to claim 1, which comprises providing the plastic parison as a co-extruded parison having at least two layers.

8. The process according to claim 7, which comprises providing the parison with at least one reinforced layer and an unreinforced layer as the two layers.

9. The process according to claim 1, which comprises forming the molding element as a further mold which interacts with the mold.

10. The process according to claim 1, which comprises forming the molding element as a plastic molded part that interacts with the mold.

11. The process according to claim 10, which comprises covering the plastic blow-molded part with a decorative material.

12. An apparatus for producing a plastic blow-molded part, comprising:

a molding element having at least one projecting region with openings formed therein which can be connected to a negative pressure source;

a molding box surrounding said molding element and capable of being subjected to negative pressure, said molding box and said molding element being movable in relation to each other and said molding box having a peripheral edge for securely clamping an edge region of a parison by means of a separate holding device; and a mold disposedopposite said molding element, said mold having mold parts that are movable in such a way that, in a moved-together state, said mold parts can be brought to bear against a contour of the plastic blow-molded part to be produced.

13. The apparatus according to claim 12, including contour elements for preforming the parison disposed in said molding box.

14. The apparatus according to claim 12, wherein said mold parts of said mold have openings formed therein that can be connected to the negative pressure source.

15. The apparatus according to claim 12, wherein said mold is configured at least in certain regions as a jointed band with a number of articulation points.

16. The apparatus according to claim 12, wherein said molding element is a further mold which interacts with said mold.

17. The apparatus according to claim 12, wherein said molding element is a preformed plastic part that interacts with said mold.

18. The apparatus according to claim 12, wherein said mold parts can be brought to bear against said projecting region of said molding element.

\* \* \* \* \*